United States Patent [19]

Unruh

[11] 4,097,060
[45] Jun. 27, 1978

[54] ROLL STIFFENING AND DAMPENING IN ARTICULATED VEHICLES

[75] Inventor: Dale H. Unruh, Peoria, Ill.

[73] Assignee: Caterpillar Tractor Co., Peoria, Ill.

[21] Appl. No.: 782,668

[22] Filed: Mar. 30, 1977

[51] Int. Cl.² ............................................. B62D 53/00
[52] U.S. Cl. ................................... 280/492; 180/134
[58] Field of Search .................. 180/51, 52, 134, 135, 180/136, 137, 138, 139; 280/400, 492, 446 R, 446 B, 447

[56] References Cited

U.S. PATENT DOCUMENTS

| | | | |
|---|---|---|---|
| 3,434,739 | 3/1969 | Schoonover | 280/492 |
| 3,525,539 | 8/1970 | Illar | 280/492 X |
| 3,914,065 | 10/1975 | Domenighetti | 280/400 |

Primary Examiner—Robert R. Song
Assistant Examiner—R. Schrecengost

Attorney, Agent, or Firm—Wegner, Stellman, McCord, Wiles & Wood

[57] ABSTRACT

An articulated vehicle comprising first and second vehicle frames, ground engaging devices on each of the frames for engaging the underlying terrain and supporting the vehicle for movement thereover, a coupling securing the frames together for relative rolling movement about a generally horizontal axis and for relative pivotal movement about a generally vertical axis, a double-acting hydraulic cylinder interconnecting the frames at a location on at least one frame remote from the coupling, a pair of fluid flow restrictions, one connected to each end of the cylinder, and a pair of accumulators, each connected to a corresponding one of the restrictions to receive from or direct hydraulic fluid to the corresponding end of the cylinder through the associated restriction to thereby resist and dampen relative rolling movement of the frames.

5 Claims, 2 Drawing Figures

ROLL STIFFENING AND DAMPENING IN ARTICULATED VEHICLES

BACKGROUND OF THE INVENTION

This invention relates to articulated vehicles, and more particularly, to means for resisting and damping roll oscillations about a center pivot in articulated vehicles.

Most wheel loaders and similar articulated, four-wheel drive vehicles provide for oscillation between the front and rear axles. Many accommodate such oscillation at the rear axle connection to the vehicle frame, while others provide for such oscillation at the hitch or coupling between the front and rear frames of the articulated vehicle. The oscillation is desirable in that it allows relative rotation of vehicle components so that all four wheels or other ground engaging means are in contact with the underlying ground, even in rough terrain. However, permitting such oscillation also reduces the stability of the vehicle from that which would be present if the oscillation were not allowed.

Conversely, if the oscillation is not allowed to occur, the vehicle characteristics become undesirable from the standpoing of traction, maneuverability, and tire life.

Thus, there is a real need for an articulated vehicle wherein all four ground engaging means may be maintained on the ground over rough terrain and wherein vehicle stability is improved.

SUMMARY OF THE INVENTION

The present invention is directed to overcoming one or more of the above problems.

According to the present invention, there is provided an articulated vehicle including first and second vehicle frames. Ground engaging means are disposed on each of the frames for engaging the underlying terrain supporting the vehicle for movement thereover. Means couple the frames together for relative rolling movement about a generally horizontal axis and for relative pivotal movement about a generally vertical axis. Means also interconnect the frames at a location on at least one frame remote from the coupling means for (a) resisting and (b) dampening rolling movement between the frames about the generally horizontal axis.

Other objects and advantages will become apparent from the following specification taken in connection with the accompanying drawings.

DESCRIPTION OF THE PREFERRED EMBODIMENT

Figure 1:
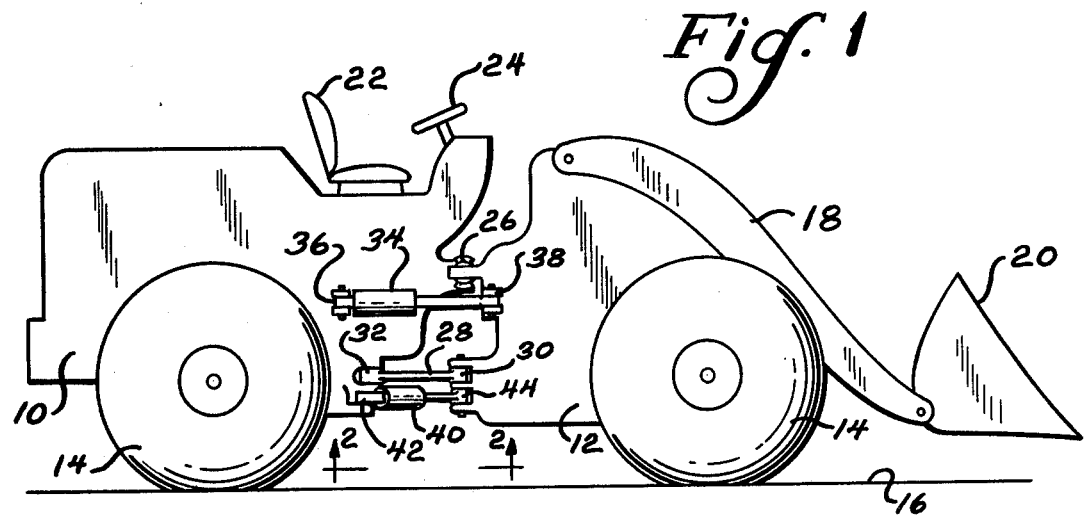
FIG. 1 is a side elevation of an articulated vehicle, specifically, a wheeled front end loader, embodying the invention.
Figure 2:
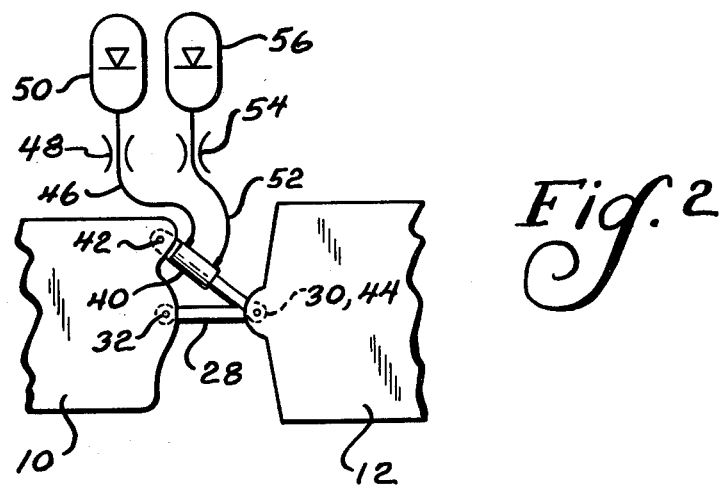
FIG. 2 is a fragmentary, partial schematic view taken approximately along the line 2—2 of FIG. 1.

An exemplary embodiment of an articulated vehicle made according to the invention is illustrated in FIGS. 1 and 2 and is seen to include a rear frame 10 and a front frame 12. Each of the frames 10 and 12, on opposite sides thereof, mounts ground engaging means in the form of wheels 14 (only two of which are shown) and which engage the underlying terrain 16 for supporting the vehicle for movement over the ground.

In the illustrated embodiment, the articulated vehicle is in the form of a wheeled, front end loader, having lift arms 18 supporting a bucket 20. Suitable hydraulic motors are utilized for effecting relative movement between the vehicle, the lift arms 18 and the bucket 20 and form no part of the present invention.

The rear frame 10 carries an operator seat 22 and a steering wheel 24. The frames 10 and 12 are connected by a coupling including a heavy duty ball joint 26 which would allow limited, but universal relative movement between the frames 10 and 12. As is well known, it is desirable to pivot the frames relative to each other about a substantially vertical axis for steering purposes and to allow the frames to pivot about a substantially horizontal axis extending longitudinally of the vehicle. Such movement is termed rolling movement and is necessary to provide the necessary oscillation that allows the wheels 14 to remain in contact with the ground 16 at all times, even when travelling in extremely rough terrain.

However, it is undersirable to allow pivotal movement about a horizontal axis transverse to that mentioned in the preceding paragraph, that is, allow the frames 10 and 12 to pitch with respect to each other. To prevent such pitching movement, the coupling further includes a link 28 connected by a ball joint 30 of conventional construction to the front frame, and to the rear frame 10 by a similar ball joint 32, also of conventional construction. The link 28 is generally horizontally disposed and, as seen in FIG. 2, extends along the longitudinal centerline of the vehicle.

A pair of hydraulic cylinders 34 (only one of which is shown) are utilized as steering cylinders in a conventional fashion. The cylinders 34 are disposed on opposite sides of the vehicle and have their cylinder ends connected by ball joints 36 to the rear frame and their rod ends connected by ball joints 38 to the front frame 12.

In order to improve stability of the vehicle, and yet allow relative rolling movement of the frames 10 and 12 with respect to each other so that the wheels 14 may continuously engage the ground even in extremely rough terrain, means are provided which interconnect the frames 10 and 12 for (a) resisting and (b) dampening rolling movement between the frames about the roll axis, that is, the generally horizontal axis extending through the coupling 26 longitudinally of the vehicle. As seen in FIG. 1, a double-acting hydraulic cylinder 40 has its cylinder end connected by a ball joint 42 to the rear frame 10 at a location remote from the coupling 26 such that the cylinder 40 is skewed with respect to the centerline of the vehicle. The rod end of the cylinder 40 is connected by a ball joint 44 vertically aligned with, but below the ball joint 30. One end of the cylinder 40 is connected to a line 46 which extends through a fluid flow restriction or orifice 48 to a conventional accumulator 50. The rod end of the cylinder 40 is connected via a line 52 through a fluid flow restriction or orifice 54 to a similar accumulator 56.

When the frames 10 and 12 roll with respect to each other, by reason of the displacement of the cylinder 40 from the roll axis, the rod thereof will either extend or retract with respect to the cylinder. Consequently, hydraulic fluid will be directed from one end of the cylinder through either the line 46 or 52 through the fluid flow restricting device 48 or 54 to the associated accumulator 50 or 56 which will normally be preloaded. Consequently, the accumulators 50 and 56 act as resilient means, through the accumulation and buildup of pressure therein when fluid is being directed into the same, which resist rolling movement. At the same time, the orifices 48 and 54 restrict the rate of fluid flow, and thus the rate of relative movement of the frame to dampen the rolling movement. Depending upon the direction of roll, either the accumulator 50 or the accumulator 56 will be charged.

If desired, instead of the one double-acting cylinder 40, two single-acting cylinders could be employed, as will be apparent to those skilled in the art.

It will be observed that by vertically aligning the ball joint 44 with the steering pivot axis defined by ball joints 26 and 30, the roll damping and resisting means of the invention is not brought into action for purely pivotal motion between frames for steering purposes.

By reason of the stiffness or resistance to rolling movement, and the dampening of the same, it will be appreciated that vehicle stability will be greatly increased. At the same time, the restrained roll retains the desirable features of articulated vehicles wherein roll is permitted from the standpoint of traction, maneuverability and tire life.

The embodiments of the invention in which an exclusive property or privilege is claimed are defined as follows:

1. An articulated vehicle comprising:
   first and second vehicle frames;
   ground engaging means on each of said frames for emgaging the underlying terrain and supporting the vehicle for movement thereover;
   means coupling said frames together for relative rolling movement about a generally horizontal axis and for relative pivotal movement about a generally vertical axis; and
   means interconnecting said frames at a location on at least one frame remote from said coupling means for (a) resisting and (b) dampening rolling movement between said frames about said generally horizontal axis.

2. An articulated vehicle comprising:
   first and second vehicle frames;
   ground engaging means on each of said frames for engaging the underlying terrain and supporting the vehicle for movement thereover;
   means coupling said frames together for relative rolling movement about a generally horizontal axis and for relative pivotal movement about a generally vertical axis;
   at least one hydraulic cylinder interconnecting said frames at a location on at least one frame remote from said coupling;
   an accumulator in fluid communication with said cylinder; and
   a fluid flow restriction hydraulically interposed between said cylinder and said accumulator.

3. An articulated vehicle comprising:
   first and second vehicle frames;
   ground engaging means on each of said frames for engaging the underlying terrain and supporting the vehicle for movement thereover;
   means coupling said frames together for relative rolling movement about a generally horizontal axis and for relative pivotal movement about a generally vertical axis;
   a double-acting hydraulic cylinder interconnecting said frames at a location on at least one frame remote from said coupling means;
   a pair of fluid flow restrictions, one connected to each end of said cylinder; and
   a pair of accumulators, each connected to a corresponding one of said restrictions to receive from or direct hydraulic fluid to the corresponding end of said cylinder through the associated restriction.

4. The articulated vehicle of claim 3 wherein said coupling means comprises a universal joint and a vertically spaced link both interconnecting said frames, said link being operative to limit relative pitching movement between said frame.

5. An articulated vehicle comprising:
   first and second vehicle frames;
   ground engaging means on each of said frames for engaging the underlying terrain and supporting the vehicle for movement thereover;
   means coupling said frames together for relative rolling movement about a generally horizontal axis and for relative pivotal movement about a generally vertical axis; and
   means interconnecting said frames at a location on at least one frame remote from said coupling means for (a) resisting and (b) dampening rolling movement between said frames about said generally horizontal axis;
   said interconnecting means including resilient means for resisting said relative rolling movement and rolling movement speed restricting means for dampening said relative rolling movement.

* * * * *